(12) United States Patent
Wadzinski

(10) Patent No.: US 6,688,095 B2
(45) Date of Patent: Feb. 10, 2004

(54) BLADE COUPLER ASSEMBLY FOR USE WITH A SELF-PROPELLED, WALK-BEHIND ROTARY LAWN MOWER

(75) Inventor: Chris A. Wadzinski, Inver Grove Heights, MN (US)

(73) Assignee: The Toro Company, Bloomington, MN (US)

(*) Notice: Subject to any disclaimer, the term of this patent is extended or adjusted under 35 U.S.C. 154(b) by 0 days.

(21) Appl. No.: 10/109,808

(22) Filed: Mar. 28, 2002

(65) Prior Publication Data

US 2003/0182917 A1 Oct. 2, 2003

(51) Int. Cl.[7] ............................................. A01D 34/63
(52) U.S. Cl. ......................................... 56/255; 56/17.5
(58) Field of Search ........................ 56/17.5, 255, 295, 56/DIG. 17, DIG. 22, 11.6, 11.7, 11.8, 17.1, 17.2

(56) References Cited

U.S. PATENT DOCUMENTS

| | | | |
|---|---|---|---|
| D168,064 S | 10/1952 | Morris et al. | |
| 2,760,589 A | 8/1956 | Rudman | |
| D181,280 S | 10/1957 | Faxstein et al. | |
| 2,860,473 A | 11/1958 | Wehner et al. | |
| 3,085,386 A | 4/1963 | Slemmons | |
| 3,085,387 A | 4/1963 | Harper | |
| 3,118,267 A | 1/1964 | Shaw | |
| 3,157,978 A | 11/1964 | McMullen | |
| 3,538,692 A | 11/1970 | Cope et al. | |
| 3,722,642 A | 3/1973 | Zurek et al. | |
| 3,754,616 A | 8/1973 | Watland | |
| 3,795,095 A | 3/1974 | Erickson et al. | |
| 3,798,987 A | 3/1974 | Hurd et al. | |
| 3,802,170 A | 4/1974 | Seifert et al. | |
| 3,943,785 A | * 3/1976 | Percifield | 474/93 |
| 3,967,438 A | 7/1976 | Tombers | |
| D246,313 S | 11/1977 | Gunn et al. | |
| 4,117,652 A | 10/1978 | Jones et al. | |
| 4,146,105 A | 3/1979 | Scag | |
| 4,280,319 A | 7/1981 | Scanland | |
| 4,307,558 A | 12/1981 | Bent et al. | |

(List continued on next page.)

OTHER PUBLICATIONS

"Safety Instructions & Operator's Manual for Snapper® 21" Steel Deck Walk Mowers Series 14," Manual No. 4–1936, Rev. 1, Snapper Inc., (1997).

"Yard–Man™ by MTD Operator's Manual 21" Self–Propelled Mulching Mower Model No. 12A–559K401," Form No. 770–10145, MTD Products, Inc., (1998).

"Lawn–Boy® SilverProSeries™ Walk–behind Power Mower Operator's Manual," Form No. 3321–749 Rev A, Lawn–Boy Inc., (1998).

"Safety Instructions & Operator's Manual for Snapper® 21"Steel Deck Walk Mower Series 12," Manual No. 3–5743, Snapper, (1996).

(List continued on next page.)

*Primary Examiner*—Robert E. Pezzuto
(74) *Attorney, Agent, or Firm*—Mueting, Raasch & Gebhardt, P.A.

(57) ABSTRACT

A blade coupler assembly operable to couple a cutting blade and a drive belt to a lawn mower engine crankshaft. The blade coupler assembly may include a blade/belt driver assembly having a tube portion with a first bore defined by a first diameter, wherein the first bore spans between a first longitudinal end and a second longitudinal end of the tube portion. A pulley portion may be fixed to the tube portion such that at least a portion of the pulley portion abuts the first longitudinal end of the tube portion. The pulley portion preferably includes a second bore defined by a second diameter, wherein the second diameter is less than the first diameter. A blade receiver portion may be fixed to the tube portion such that the blade receiver portion abuts the second longitudinal end of the tube portion.

35 Claims, 6 Drawing Sheets

U.S. PATENT DOCUMENTS

| | | |
|---|---|---|
| 4,326,370 A | 4/1982 | Thorud |
| 4,366,995 A | 1/1983 | Kocian |
| 4,409,779 A | 10/1983 | Bent et al. |
| 4,478,029 A | 10/1984 | Moore et al. |
| 4,689,939 A | 9/1987 | Seyerle |
| 4,771,593 A | 9/1988 | Lee |
| 4,817,372 A | 4/1989 | Toda et al. |
| 4,896,487 A | 1/1990 | Hikishima et al. |
| 4,899,526 A | 2/1990 | Harris |
| 4,989,398 A | 2/1991 | Kuhn et al. |
| 5,117,617 A | 6/1992 | Scag |
| 5,157,908 A | 10/1992 | Sebben et al. |
| 5,299,414 A | 4/1994 | Long |
| 5,377,774 A | 1/1995 | Lohr |
| 5,398,489 A | 3/1995 | Oshima |
| 5,410,867 A | 5/1995 | Plamper et al. |
| 5,426,926 A | 6/1995 | Delery et al. |
| 5,454,216 A | 10/1995 | Myszka |
| 5,481,857 A | 1/1996 | Umemoto et al. |
| 5,493,851 A | 2/1996 | Katzer et al. |
| 5,499,494 A | 3/1996 | Boshell et al. |
| 5,502,958 A | 4/1996 | Plamper |
| 5,507,586 A | 4/1996 | Myszka |
| 5,615,542 A | 4/1997 | Thorud et al. |
| 5,638,667 A | 6/1997 | Ellson et al. |
| 5,638,668 A | 6/1997 | Kallevig et al. |
| 5,724,796 A | 3/1998 | Plamper |
| 5,881,540 A | 3/1999 | Miller |
| 5,946,895 A | 9/1999 | Martens |
| 5,960,617 A * | 10/1999 | Sheldon .................. 56/17.5 |
| D424,578 S | 5/2000 | Friberg et al. |
| 6,205,755 B1 | 3/2001 | Bontrager et al. |
| 6,286,293 B1 | 9/2001 | Scag et al. |
| 6,425,452 B1 | 7/2002 | Steiner et al. |

OTHER PUBLICATIONS

"Owner's Manual Rotary Mower—Honda Harmony II," Honda Power Equipment, American Honda Motor Co., Inc., (1997).

"Owner's Manual Rotary Mower—Honda Harmony," Honda Power Equipment, American Honda Motor Co., Inc., (1996).

"Safety, Preparation, Operation, and Maintenance Manual—Model 21997X8A," Manual No. F–000414M, Scotts, (date unknown).

Photographs of "Scotts Model 21995X8B" mower, 1 pg, (1999).

Photographs of "Sears Craftsman Model 917.377543" mower, 1 pg, (1999).

Photographs of "John Deere Model JS 63" mower, 1 pg, (1999).

* cited by examiner

BLADE COUPLER ASSEMBLY FOR USE WITH A SELF-PROPELLED, WALK-BEHIND ROTARY LAWN MOWER

TECHNICAL FIELD

The present invention relates to a self-propelled, walk-behind rotary lawn mower and, more specifically, to a blade coupler assembly for use in attaching a cutting blade to the same.

BACKGROUND OF THE INVENTION

Conventional walk-behind, rotary lawn mowers typically include a mower deck supported by multiple, e.g., four, wheels. In general, the top side of the deck forms an engine mounting surface to receive a prime mover (e.g., an internal combustion engine or an electric motor) while the underside of the deck forms a cutting chamber operable to house a cutting blade. The cutting blade is typically attached to a lower end of a vertical drive shaft, e.g., an engine crankshaft, which extends downwardly through the mower deck and into the cutting chamber. During operation, the drive shaft rotates the cutting blade at a speed sufficient to sever grass and other vegetation.

Although the cutting blade may attach directly to the crankshaft, many mowers use an intermediate blade coupling device between the cutting blade and the crankshaft. The coupling device may form a flanged hub to which the cutting blade is bolted. Examples of such coupling devices are found in U.S. Pat. Nos. 3,085,386 (Slemmons) and U.S. Pat. No. 4,307,558 (Bent et al.).

In addition to incorporating a coupling device, modem walk-behind mowers may also include a transmission to provide driving power to one or more of the wheels. The transmission typically receives power from a drive pulley which is also attached to the crankshaft, typically via a set screw, pin, or the like.

While more than adequate for their intended purposes, many of the current blade coupling devices and drive pulleys have drawbacks. For instance, numerous parts are often required to attach the blade coupling device and the drive pulley to the crankshaft. As a consequence, manufacturing/production costs may be higher than desired. Moreover, higher part counts may be perceived by the end user to equate with greater complexity with respect to assembly and/or maintenance aspects of the mower.

One design that addresses some of these concerns is illustrated in U.S. Pat. No. 3,157,978 (McMullen). This patent discloses a locking hub for a lawn mower blade. While directed to other aspects, e.g., positive locking of the blade and the incorporation of a friction washer, the '978 patent illustrates incorporation of a V-belt groove on a flange member of the locking hub. However, certain aspects of '978 locking hub—e.g., the large diameter flange member, the relatively deep blind bore formed therein, and the numerous pieces required to secure the blade—may still yield a coupling device having higher than desired cost.

U.S. Pat. No. 4,817,372 (Toda et al.) illustrates a blade holder utilizing a collar with a drive pulley. Once again, however, drawbacks remain, e.g., the machined collar and the multiple components necessary to secure the blade.

SUMMARY OF THE INVENTION

The present invention provides a blade coupler assembly which may include a blade/belt driver assembly operable to permit coupling of both a cutting blade and a drive belt to a drive shaft of a prime mover.

In one embodiment, a blade/belt driver assembly operable to couple a cutting blade and a drive belt to a lawn mower engine drive shaft is provided. The blade/belt driver assembly includes a tube having a first bore defined by a first diameter, where the first bore spans between a first longitudinal end and a second longitudinal end of the tube. A pulley is also included and is fixed to the tube such that at least a portion of the pulley abuts the first longitudinal end of the tube. The pulley has a second bore defined by a second diameter, wherein the second diameter is less than the first diameter. The blade/belt driver assembly further includes a blade receiver fixed to the tube such that the blade receiver abuts the second longitudinal end of the tube. The blade receiver has a third bore defined by a third diameter.

In another embodiment of the invention, a method for attaching a cutting blade and a drive belt to a lawn mower engine crankshaft is provided. The method includes sliding a blade/belt driver assembly over a first end of the engine crankshaft. In this embodiment, the blade/belt driver assembly includes a tube having a first bore defined by a first diameter, wherein the first bore spans between a first longitudinal end and a second longitudinal end of the tube. Also included is a pulley fixed to the tube such that at least a portion of the pulley abuts the first longitudinal end of the tube. The pulley includes a second bore defined by a second diameter, wherein the second diameter is less than the first diameter. The blade/belt driver assembly also includes a blade receiver fixed to the tube such that the blade receiver abuts the second longitudinal end of the tube. The blade receiver includes a third bore defined by a third diameter, the third bore having a centerline which is substantially coaxial with a centerline of the second bore. The method also includes positioning a first side of the cutting blade in an abutting relationship with the blade receiver, and passing a fastener through an opening in the cutting blade and through the third bore. The fastener is then threaded into a threaded hole located in the first end of the engine crankshaft.

In yet another embodiment of the invention, a lawn mower is provided. The mower includes a mower deck supported by a plurality of ground engaging wheels and defining a cutting chamber. Also included is a prime mover coupled to a first side of the mower deck, the prime mover having a crankshaft extending through the mower deck and terminating at a first end within the cutting chamber. A blade/belt driver assembly operable for interconnecting a cutting blade and a drive belt to the crankshaft is also included. The driver assembly includes a tube having a first bore defined by a first diameter, the first bore spanning between a first longitudinal end and a second longitudinal end of the tube. Also included is a pulley welded to the such tube such that at least a portion of the pulley abuts the first longitudinal end of the tube. The pulley has a second bore defined by a second diameter, wherein the second diameter is less than the first diameter. The first bore and the second bore are operable to receive the first end of the crankshaft. The driver assembly still further includes a blade receiver welded to the tube such that the blade receiver abuts the second longitudinal end of the tube, wherein the blade receiver has a third bore defined by a third diameter.

In still yet another embodiment, a blade coupler assembly operable to interconnect a cutting blade and a drive belt to an engine crankshaft of a self-propelled lawn mower is provided. The blade coupler assembly includes a blade/belt driver assembly and a fastener operable to secure the cutting blade and the blade/belt driver assembly to a first end of the engine crankshaft. The blade/belt driver assembly includes a tube having a first bore defined by a first diameter, wherein the first bore spans between a first longitudinal end and a second longitudinal end of the tube. A pulley is also included and is fixed to the tube such that at least a portion of the pulley abuts the first longitudinal end of the tube. The pulley has a second bore defined by a second diameter, wherein the second diameter is less than the first diameter and further wherein the first bore and the second bore are operable to slide over the first end of the engine crankshaft. The blade/belt driver assembly also includes a blade receiver fixed to the tube such that the blade receiver abuts the second longitudinal end of the tube. The blade receiver has a third bore defined by a third diameter, wherein a portion of the blade receiver is operable to abut a first side of the cutting blade.

The above summary of the invention is not intended to describe each embodiment or every implementation of the present invention. Rather, a more complete understanding of the invention will become apparent and appreciated by reference to the following detailed description and claims in view of the accompanying drawing.

DESCRIPTION OF THE VIEWS OF THE DRAWING

The present invention will be further described with reference to the drawing, wherein.

DETAILED DESCRIPTION OF EXEMPLARY EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
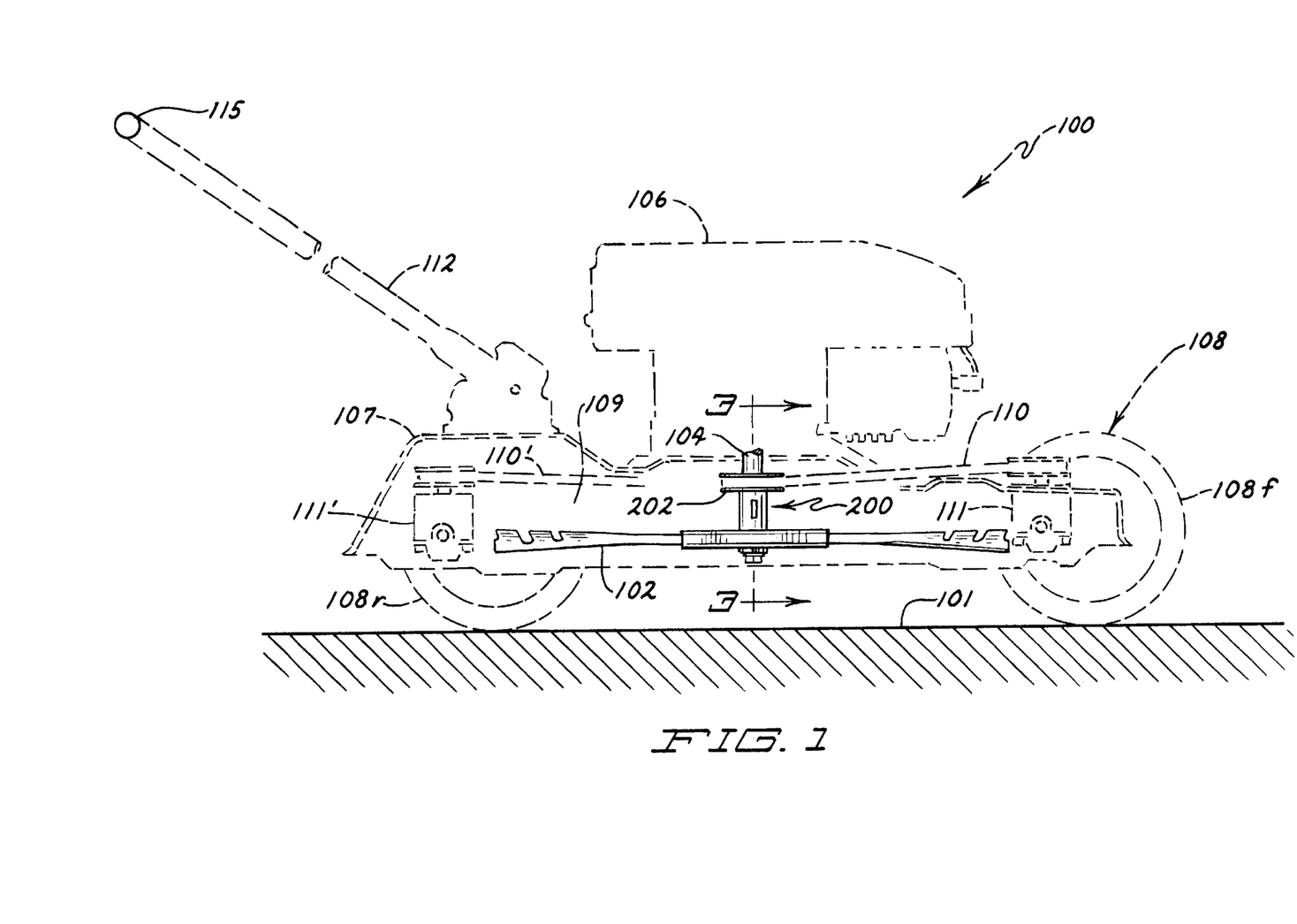
FIG. 1 is a diagrammatic side elevation view of a rotary lawn mower incorporating a blade coupler assembly in accordance with one embodiment of the present invention.

FIG. 1 illustrates a blade coupler assembly 200 in accordance with one embodiment of the present invention as the blade coupler assembly 200 may be incorporated on a self-propelled vehicle, e.g., a self-propelled, walk-behind lawn mower 100. In general, the blade coupler assembly 200 is operable to permit direct coupling of a cutting blade 102 to a drive shaft (preferably an engine crankshaft 104) of a prime mover, e.g., an internal combustion engine 106. Preferably, the blade coupler assembly 200 is also operable to permit coupling of a driving member, e.g., an endless drive belt 110, to the crankshaft 104. Thus, blade coupler assemblies in accordance with the present invention provide a unitary component operable both to attach the cutting blade 102 to the engine crankshaft 104 and to provide driving power to one or more wheels of the mower 100 as further described below.

While the general construction of the mower 100 itself is not considered central to the invention, it will, for the sake of clarity, be briefly described. In the exemplary embodiment illustrated in FIG. 1, the mower 100 (shown primarily in broken lines) includes a mower deck 107 defining a first or upper surface to which the engine 106 attaches, in one embodiment, the mower 100, including the deck 107, may be constructed as described in copending U.S. Pat. App. Ser. No. 10/109,804, entitled DECK ASSEMBLY FOR A SELF-PROPELLED, WALK-BEHIND ROTARY LAWN MOWER. The engine 106 is preferably oriented such that the crankshaft 104 extends vertically downward into a cutting chamber 109 defined at least in part by the deck 107. The cutting blade 102 may attach to a first, e.g., lower, end 105 (see FIG. 2) of the crankshaft 104 by way of the blade coupler assembly 200. During operation, the crankshaft 104 rotates the blade coupler assembly 200, and thus the cutting blade 102, at a speed sufficient to sever grass that passes beneath the mower 100.

Multiple ground engaging wheels 108 may support the deck 107 in rolling engagement with a ground surface 101. One or more of these wheels 108 may receive driving power from a transmission 111 which, in turn, receives power from the drive belt 110 coupled to a driving pulley 202. As illustrated, the present invention is operable with mowers 100 driving either the front wheels 108$f$ (as represented by belt 110 and transmission 111) or the rear wheels 108$r$ (as represented by partially illustrated belt 110' and transmission 111'). Similarly, other driving members, e.g., chains, may also be used without departing from the scope of the invention.

One or more handle members 112 may extend from the mower deck 107 generally rearwardly and upwardly to form an operator handle assembly 115. During operation, an operator walking behind the mower 100 may grasp the handle assembly 115 and control mower operation via manipulation of the handle assembly and/or various controls (e.g., throttle, blade clutch, mower drive speed) located thereon.

As used herein, relative terms such as "left," "right," "fore," "front," "forward," "aft," "rear," "rearward," "top," "bottom," "upper," "lower," "horizontal," "vertical," and the like are from the perspective of one operating the mower 100 while the mower 100 is in an operating configuration, e.g., while the mower 100 is positioned such that the wheels 108 rest upon a generally horizontal ground surface 101 as shown in FIG. 1. These terms are used herein to simplify the description, however, and not to limit the scope of the invention in any way.

Figure 2:
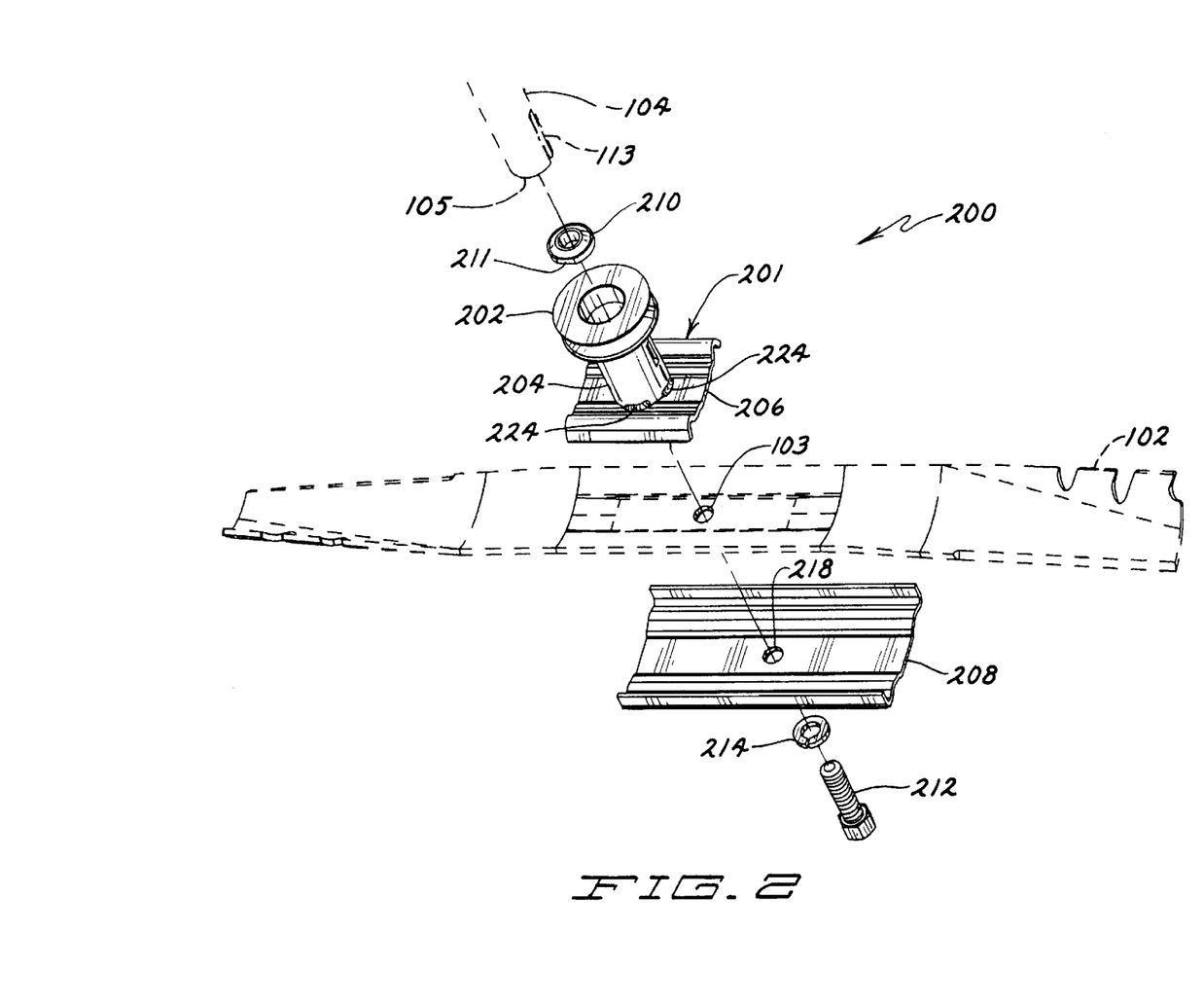
FIG. 2 is an enlarged, exploded perspective view of a blade coupler assembly in accordance with one embodiment of the present invention.

FIG. 2 is an enlarged, exploded perspective view of the blade coupler assembly 200 of FIG. 1. While not wishing to be limited to any specific configuration, the illustrated blade coupler assembly 200 may include a blade/belt driver assembly 201, a blade retainer 208, a spacer 210, and a fastener 212 (preferably with an associated lock washer 214). Other embodiments may include additional components as necessary to address a particular mower configuration.

The blade/belt driver assembly 201 is operable to interconnect the cutting blade 102 to the first end 105 of the crankshaft 104. The blade/belt driver assembly 201 may include a tube 204 (also referred to herein as tube member or portion), the pulley 202 (also referred to herein as pulley member or portion), and a blade receiver 206 (also referred to herein as receiver member or portion). The tube 204, the pulley 202, and the blade receiver 206 are preferably manufactured as separate components and subsequently rigidly and permanently fixed, e.g., welded, to one another so that the resulting blade/belt driver assembly 201 forms a singular, integral component.

Figure 3:
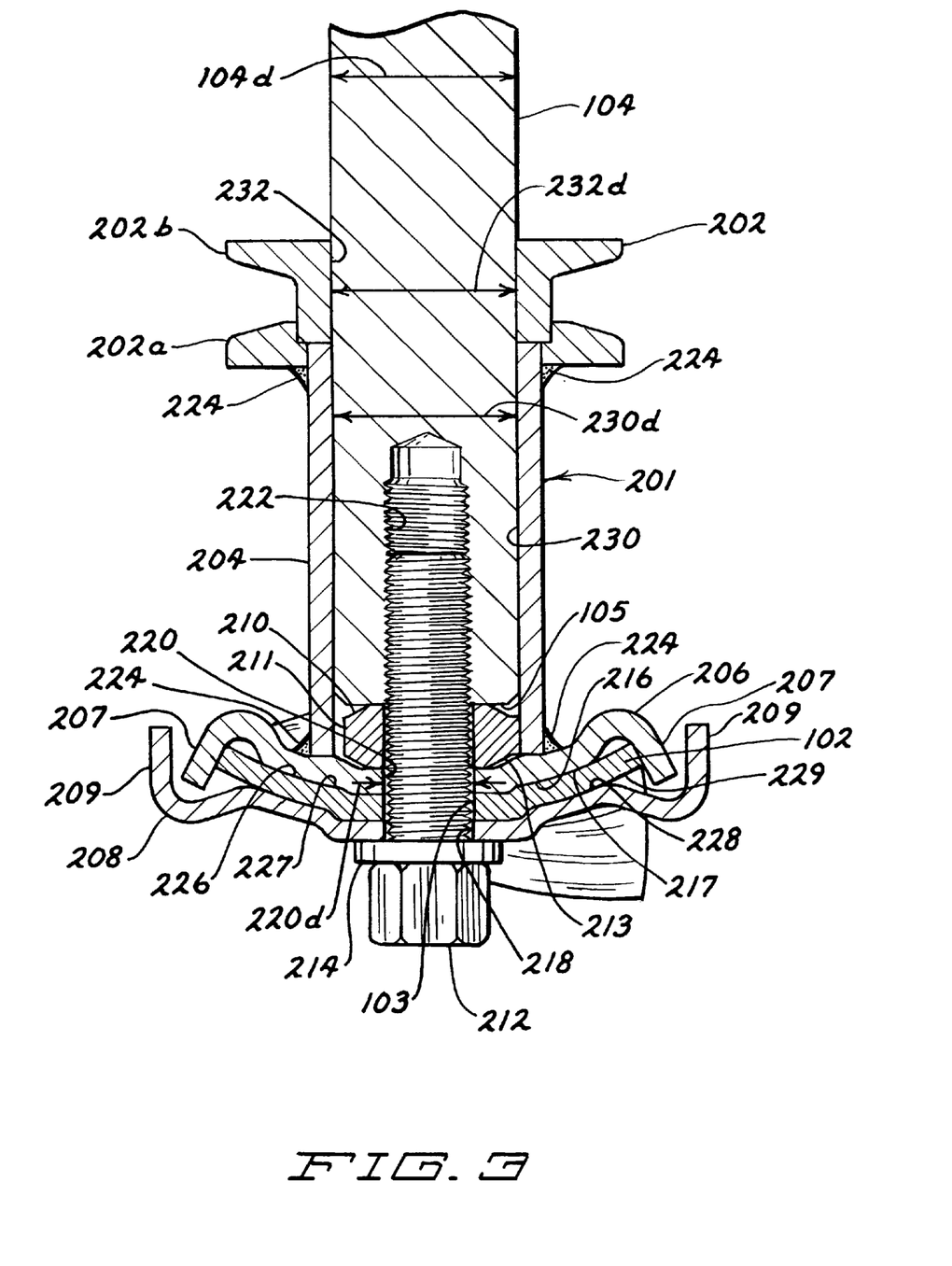
FIG. 3 is a cross sectional view of the blade coupler assembly of FIG. 1 taken along line 3—3 of FIG. 1.

FIG. 3 illustrates a cross sectional view of the blade coupler assembly 200 and cutting blade 102 of FIG. 1. The tube 204 may have a bore 230 defined by a bore diameter 230d. Preferably, the bore 230 spans from a first longitudinal end 204a to a second longitudinal end 204b of the tube 204 (see FIG. 4). The pulley 202 may have a bore 232 defined by a bore diameter 232d. Preferably, the bore diameter 232d is less than the bore diameter 230d. As a result, the blade/belt driver assembly 201 may be located relative to the crankshaft 104 by the small clearance fit between the bore diameter 232d of the pulley 202 and a shaft diameter 104d of the crankshaft 104.

Figure 4:
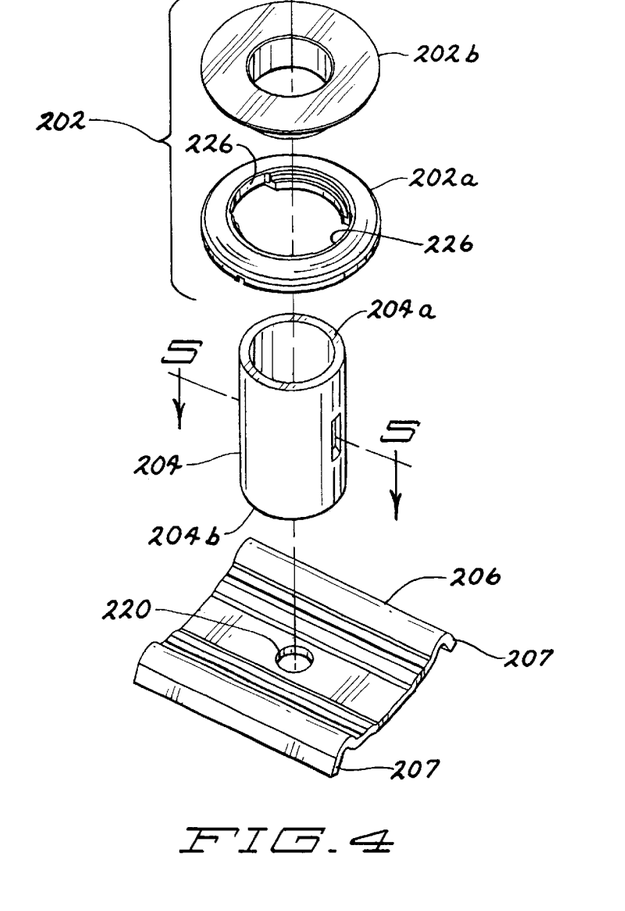
FIG. 4 is an enlarged, exploded view of a blade/belt driver assembly in accordance with one embodiment of the present invention.

The pulley 202 is preferably fixed to the tube 204 such that at least a portion of the pulley abuts the first longitudinal end 204a of the tube (see FIG. 4). Similarly, the blade receiver 206 is preferably fixed to the tube 204 such that the blade receiver abuts the second longitudinal end 204b of the tube.

As clearly illustrated in FIG. 3, the blade/belt driver assembly 201, when installed, is positioned, e.g., slid, over the first end 105 of the crankshaft 104. An integral key 215 (see FIG. 5) positioned along a surface 231 of the bore diameter 230d of the tube 204 may engage a keyway 113 in the crankshaft 104 (see FIG. 2) to transmit driving power to the blade/belt driver assembly 201. The cutting blade 102 is preferably positioned such that a first, e.g., upper, side 226 of the cutting blade is in an adjacent, abutting relationship with a first, e.g., lower, side 216 of the blade receiver 206 while a first, e.g., upper, side 228 of the blade retainer 208 is positioned in an adjacent, abutting relationship with a second, e.g., lower, side 229 of the cutting blade 102 opposite the first side 226.

With the respective parts positioned as described, the fastener 212 passes through: the washer 214; an opening 218 in the blade retainer 208; an opening 103 in the cutting blade 102; and through a bore 220 in the blade receiver 206. The fastener 212 may thread into a threaded hole 222 in the first end 105 of the crankshaft as shown in FIG. 3 in order to secure the respective pieces to the engine crankshaft 104. The spacer 210 may be positioned inside the tube 204 between both the blade receiver 206 and the first end 105 of the crankshaft 104. By locating the spacer 210 between and in contact with the blade receiver 206 and the crankshaft 104, a predetermined vertical offset distance between the cutting blade 102 and the first end 105 of the crankshaft 104 may be obtained.

FIG. 4 is an exploded view of the blade/belt driver assembly 201 of FIGS. 1–3. As mentioned above, the blade/belt driver assembly 201 is preferably produced from three separate components which are permanently fixed to one another, preferably via one or more welds. In one embodiment, welds 224 (see FIGS. 2 and 3) are provided along exterior interfaces proximate both the first longitudinal end 204a of the tube 204 and the pulley 202 as well as proximate the second longitudinal end 204b and the blade receiver 206. For example, the components of the blade/belt driver assembly 201 may be secured by four evenly spaced welds near both the first longitudinal end 204a and the second longitudinal end 204b (four welds at each end). Alternatively, substantially continuous welds (not shown) may also be used at one or both longitudinal ends 204a, 204b.

Preferably, the three components (202, 204, and 206) are fixtured prior to welding to ensure the proper location relative to one another. Fixturing is particularly beneficial in accurately locating the second longitudinal end 204b of the tube 204 relative to the nonplanar blade receiver 206.

Figure 5:
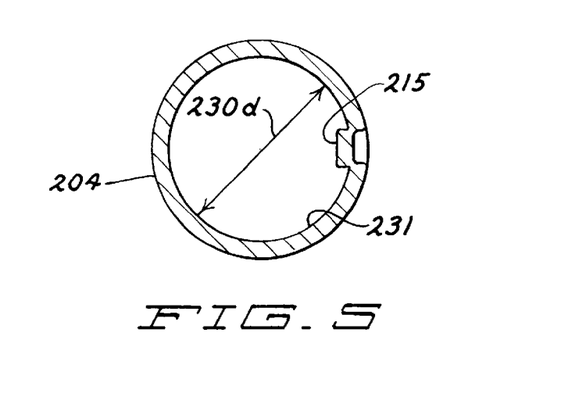
FIG. 5 is a cross-sectional view, taken along line 5—5 of FIG. 4, of a tube portion of the blade/belt driver assembly of FIG. 4.

FIG. 5 illustrates a cross-section of the tube 204 taken along line 5—5 of FIG. 4. While not limited thereto, the tube 204 is preferably formed from drawn-over-mandrel (DOM) tubing, e.g., DOM ASTM A513 steel tubing. The key 215 may be formed as an inwardly extending protrusion resulting from half-shearing a portion of the tube wall. By half-shearing a portion of the wall of the tube 204, the key 215 may be produced without any specialized machining operations. Moreover, because the bore diameter 230d of the tube 204 is not used to locate the tube relative to the crankshaft 104, localized deformations of the tube wall do not affect concentricity of the blade/belt driver assembly 201 relative to the crankshaft 104.

The pulley 202 may be produced by most any method, including machining, casting, or molding from powdered metal (PM). PM is advantageous as it offers cost effective, high volume production while yielding components having relatively tight dimensional tolerances. In the embodiment illustrated in FIGS. 3–4, the pulley 202 is produced from a first portion 202a and a second portion 202b both formed from iron alloy powdered metal. After manufacturing, the two portions 202a, 202b may be fixed together to form the pulley 202. The tight tolerances provided by the PM pulley 202 permit substantially concentric location of the blade/belt driver assembly 201 relative to the crankshaft 104 without additional machining of the pulley 202. For example, in one embodiment, the bore diameter 232d is about 0.9885±0.0015 inches (as opposed to about 1.010+0.000/−0.005 inches for the bore diameter 230d of the DOM tube 204) while the shaft diameter 104d is about 0.9829±0.0006 inches.

To ensure that the two portions 202a, 202b are securely coupled, one or more windows 226 (see FIG. 4) formed in the portion 202a may be provided. The windows 226 permit one or more of the welds 224 (see FIG. 3) to contact both pulley portions 202a and 202b.

Figure 6:
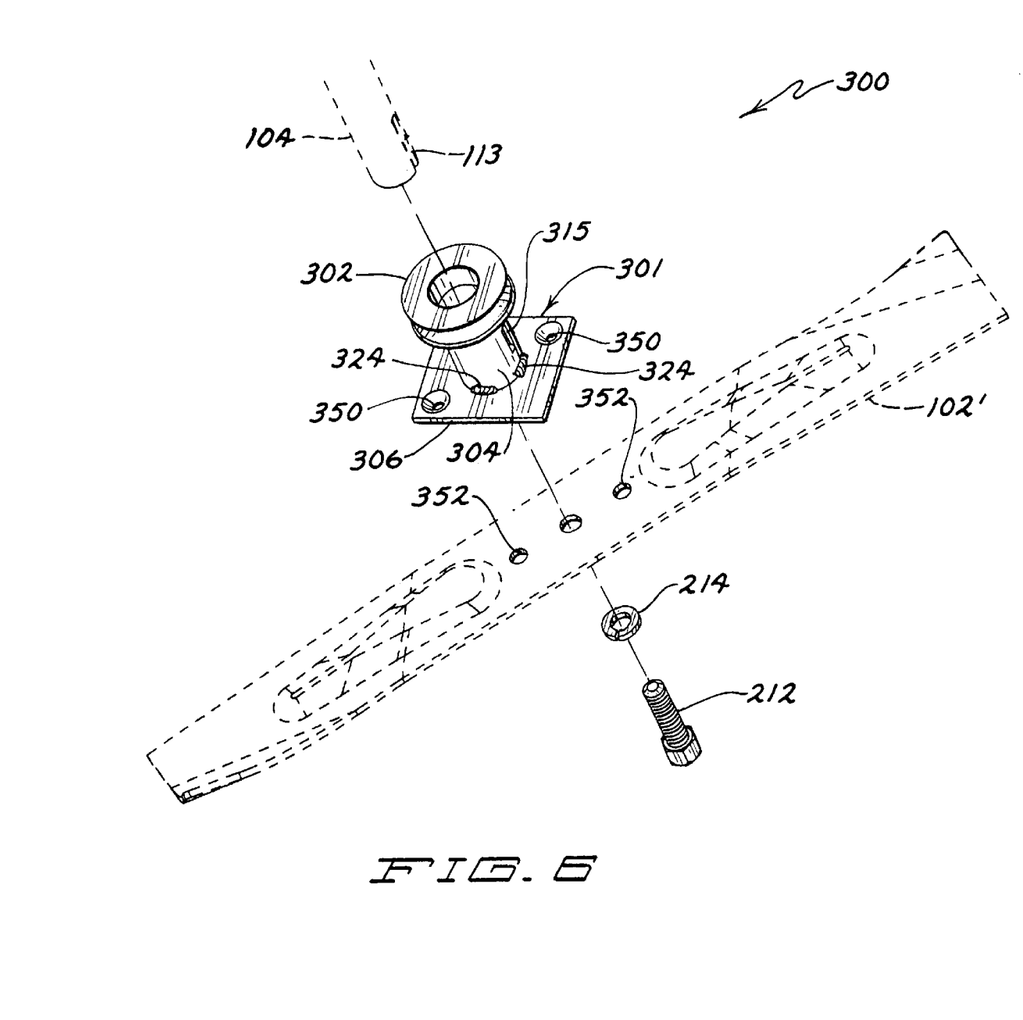
FIG. 6 is an exploded perspective view of a blade coupler assembly in accordance with another embodiment of the present invention.
Figure 7:
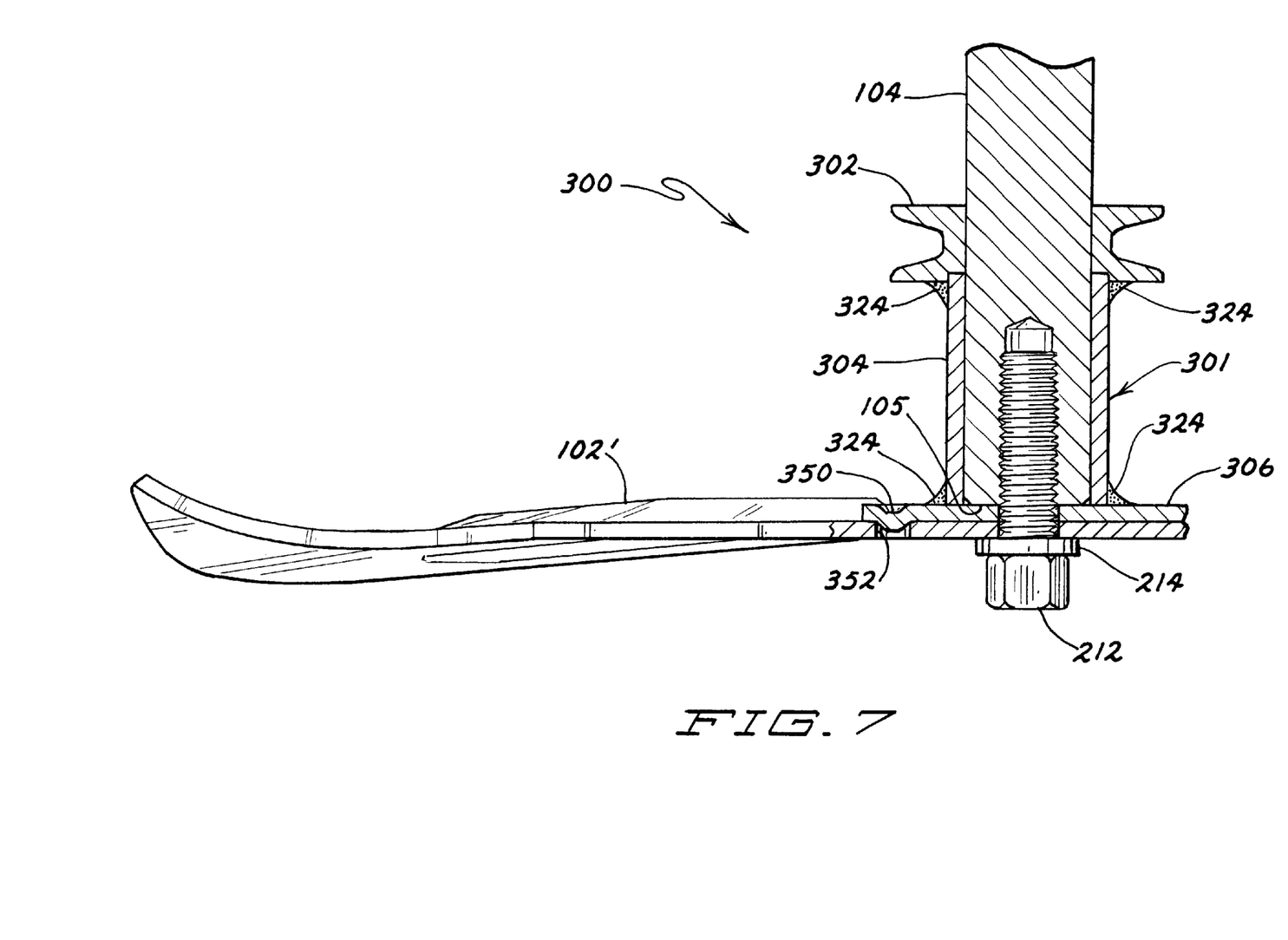
FIG. 7 is a cross sectional view of the blade coupler assembly and blade of FIG. 6 as they may be installed to an engine crankshaft.

While illustrated with multi-part construction, the pulley 202 may also be formed as a single component as illustrated in FIGS. 6 and 7. Once again, the single-part construction may be machined, cast, or molded from PM.

As described above, the blade receiver 206 is preferably formed so that at least a portion of the lower side 216 of the blade receiver 206 is substantially coincident, e.g, substantially corresponds in shape, with the upper side 226 of the cutting blade 102 as shown in FIG. 3. In the embodiments illustrated in FIGS. 1–4, the cutting blade 102 is similar in many respects to that illustrated in U.S. Pat. No. 5,615,542 (Thorud et al.) in that the upper side 226 may form one or more nonplanar surfaces, e.g., a generally concave upper surface 227 (see FIG. 3), across at least a portion of the cutting blade width. To accommodate this cutting blade configuration, the lower side 216 of the blade receiver 206 may include one or more nonplanar surfaces operable to substantially coincide with and contact the concave upper surface 227. That is, the lower side 216 forms a generally convex lower surface 217 as shown in FIG. 3.

To increase the stiffness of the blade receiver 206, ear portions 207 may be provided. Preferably, the ear portions 207 do not contact or convey power to the cutting blade 102. Rather, power transfer from the blade/belt driver assembly 201 to the cutting blade 102 results from the engagement of the convex lower surface 217 of the blade receiver 206 with the concave upper surface 227 of the cutting blade 102. Thus, point loading of the cutting blade 102 is reduced or eliminated.

Like the blade receiver 206, the blade retainer 208 (see FIGS. 2–3) is preferably formed to substantially coincide with the shape of the cutting blade 102. As a result, the upper side forms the generally concave upper surface 228 which abuts the lower side 229 of the cutting blade 102. Ear portions 209 may be formed along the lateral edges of the blade retainer 208 to increase the stiffness of the blade retainer.

The spacer 210 may have a profile having a beveled edge 213 as shown in FIG. 3. The beveled edge 213 allows consistent and even loading against the nonplanar surfaces of the blade receiver 206. To locate the spacer 210, it may be dropped through the respective bores 232, 230 of the pulley 202 and tube 204 before the blade/belt driver assembly 201 is placed over the first end 105 of the crankshaft 104. Once inserted, the spacer 210 falls to the blade receiver 206 (the lowermost point of the blade/belt driver assembly 201). To ensure that the spacer 210 traverses the key 215 (see FIG. 5), a flat 211 (see FIGS. 2–3) may be provided.

To further ensure that the blade/belt driver assembly 201 and the cutting blade 102 are accurately located, the bore 220 in the blade receiver 206 may have a bore diameter 220$d$ operable to provide a slight clearance fit, e.g, up to about 0.018 inches, with the major diameter of the fastener 212. Moreover, the bore 220 preferably has a centerline which is substantially coaxial with, e.g., within about 0.020 inches radially of, a centerline of the bore 232 of the pulley 202 (see FIG. 3).

FIGS. 6 and 7 illustrate a blade coupler assembly 300 in accordance with another embodiment of the invention. Like the blade coupler assembly 200, the assembly 300 includes a blade/belt driver assembly 301 having a tube 304, a pulley 302, and a blade receiver 306. The assembly 300 may also utilize the fastener 212 and lock washer 214 as already described herein.

The tube 304 and pulley 302 may be generally identical to the tube 204 and pulley 202 already described herein. However, unlike the embodiments described in FIGS. 1–5, the blade coupler assembly 300 is adapted to retain a cutting blade 102' that is relatively flat or planar proximate its midpoint. As a result, the blade receiver 306 forms a substantially planar, e.g., flat, member as shown.

To effectively transmit torque to the cutting blade 102', the blade receiver 306 may include protrusions 350 (only one shown in FIG. 7) which engage holes 352 in the cutting blade 102'. The protrusions 350 may be formed by pressing a die partially into the blade receiver 306 from the opposite surface. Preferably, the protrusions 350 are of appropriate diameter and length to provide sufficient contact area with the holes 352 to transmit the required loads.

With the generally flat shape of the blade receiver 306, the blade coupler assembly 300 may not require a spacer (e.g., equivalent to the spacer 210 illustrated in FIGS. 2–3). That is, the blade receiver 306 may be located in direct contact with the first end 105 of the crankshaft 104. However, the use of a spacer is optional and may be of benefit to, for example, offset the cutting blade 102' vertically from the first end 105 of the crankshaft 104.

The generally flat shape of the blade receiver 306 may also eliminate the need for a separate blade retainer such as the blade retainer 208 of FIGS. 2 and 3. However, as with the spacer, the use of a blade retainer is optional.

The blade/belt driver assembly 301 illustrated in FIGS. 6 and 7 may also include a single-piece pulley 302 as opposed to the two-piece pulley illustrated in the previous figures. The single piece pulley 302 may, like the pulley 202, be produced from most any known manufacturing process including, but not limited to, machining, casting, and PM molding.

In most other pertinent respects, the blade coupler assembly 300 is substantially identical to the blade coupler assembly 200 described above and illustrated in FIGS. 1–5. For example, the tube 304 includes a key 315 to engage the keyway 113 in the crankshaft 104. In addition, the pulley 302 and the blade receiver 306 may be permanently fixed to opposite ends of the tube 304, preferably with welds 324 similar in most respects to the welds 224 described above.

Blade coupler assemblies as described above and illustrated herein provide numerous advantages over known prior art devices. For example, by providing a blade/belt driver assembly that incorporates a cutting blade and a belt drive interconnection into a single component, the mower utilizes fewer parts. In addition, blade/belt driver assemblies as described herein do not require complex machining operations to produce the desired close tolerance between the blade/belt driver assembly and the crankshaft. For example, unlike some known blade coupling devices, no blind bores are required. Furthermore, by concentrically locating the blade/belt driver relative to the crankshaft with the bore of the pulley, the tolerance of the tube bore is less critical. In fact, tolerances of available DOM tubing (e.g., ±0.0025 inches) are typically acceptable. Still further, the PM pulley described herein achieves, without subsequent machining, acceptable bore tolerances (e.g., ±0.0015 inches) for locating the blade/belt driver relative to the crankshaft.

The complete disclosure of the patents, patent documents, and publications cited in the Background of the Invention, the Detailed Description of Exemplary Embodiments, and elsewhere herein are incorporated by reference in their entirety as if each were individually incorporated.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention. Thus, the invention is limited only by the following claims, and equivalents thereto.

What is claimed is:

1. A blade/belt driver assembly operable to couple a cutting blade and a drive belt to a lawn mower engine drive shaft, the blade/belt driver assembly comprising:

a tube having a first bore defined by a first diameter, the first bore spanning between a first longitudinal end and a second longitudinal end of the tube;

a pulley fixed to the tube such that at least a portion of the pulley abuts the first longitudinal end of the tube, the pulley having a second bore defined by a second diameter, wherein the second diameter is less than the first diameter; and a blade receiver fixed to the tube such that the blade receiver abuts the second longitudinal end of the tube, the blade receiver having a third bore defined by a third diameter.

2. The blade/belt driver assembly of claim 1, wherein the third bore comprises a centerline which is substantially coaxial with a centerline of the second bore.

3. The blade/belt driver assembly of claim 1, wherein the blade receiver comprises one or more nonplanar surfaces operable to directly contact one or more nonplanar surfaces of the cutting blade.

4. The blade/belt driver assembly of claim 1, wherein the first bore of the tube and the second bore of the pulley are operable to receive a first end of the engine drive shaft.

5. The blade/belt driver assembly of claim 1, wherein the tube further comprises an inwardly extending protrusion located along a portion of the first bore.

6. The blade/belt driver assembly of claim 5, wherein the protrusion comprises a key operable to engage a keyway in the engine drive shaft.

7. The blade/belt driver assembly of claim 1, wherein third diameter is less than the second diameter.

8. The blade/belt driver assembly of claim 1, wherein the tube comprises drawn-over-mandrel (DOM) tubing.

9. The blade/belt driver assembly of claim 1, wherein the pulley and the blade receiver are each fixed to the tube by one or more welds.

10. The blade/belt driver assembly of claim 1, wherein the blade receiver comprises one or more nonplanar surfaces.

11. The blade/belt driver assembly of claim 1, wherein the blade receiver comprises a substantially planar member.

12. A blade/belt driver assembly operable to connect a cutting blade and a drive belt to a lawn mower engine crankshaft, the blade/belt driver assembly comprising:
  a tube portion having a first bore defined by a first diameter, the first bore extending from a first longitudinal end to a second longitudinal end of the tube portion;
  a pulley portion operable to deliver driving power to one or more drive wheels, the pulley portion having a second bore defined by a second diameter where the second diameter is less than the first diameter, and wherein the pulley portion is rigidly fixed to the tube portion such that the pulley portion abuts the first longitudinal end of the tube portion; and
  a blade receiver portion operable to receive the cutting blade in an abutting relationship, the blade receiver portion rigidly fixed to the tube portion such that the blade receiver portion abuts the second longitudinal end of the tube portion.

13. The blade/belt driver assembly of claim 12, wherein the tube portion comprises an integral key operable to engage a corresponding keyway in the engine crankshaft.

14. The blade/belt driver assembly of claim 12, wherein the tube portion comprises drawn-over-mandrel (DOM) tubing.

15. The blade/belt driver assembly of claim 12, wherein the pulley portion and the blade receiver portion are rigidly fixed to the tube portion by one or more welds.

16. A method for attaching a cutting blade and a drive belt to a lawn mower engine crankshaft, the method comprising:
  sliding a blade/belt driver assembly over a first end of the engine crankshaft, the blade/belt driver assembly comprising:
    a tube having a first bore defined by a first diameter, the first bore spanning between a first longitudinal end and a second longitudinal end of the tube;
    a pulley fixed to the tube such that at least a portion of the pulley abuts the first longitudinal end of the tube, the pulley having a second bore defined by a second diameter, wherein the second diameter is less than the first diameter; and
    a blade receiver fixed to the tube such that the blade receiver abuts the second longitudinal end of the tube, the blade receiver having a third bore defined by a third diameter, the third bore having a centerline which is substantially coaxial with a centerline of the second bore;
  positioning a first side of the cutting blade in an abutting relationship with the blade receiver;
  passing a fastener through an opening in the cutting blade and through the third bore; and
  threading the fastener into a threaded hole located in the first end of the engine crankshaft.

17. The method of claim 16, further comprising:
  providing a blade retainer comprising an opening that is operable to generally align with the opening in the cutting blade;
  positioning the blade retainer in an abutting relationship with a second side of the cutting blade; and
  passing the fastener through the opening in the blade retainer prior to passing the fastener through the opening in the cutting blade.

18. The method of claim 16, further comprising positioning a spacer between and in contact with both the blade receiver and the first end of the engine crankshaft.

19. The method of claim 16, further comprising transmitting power from the engine crankshaft to the cutting blade substantially through direct contact between one or more surfaces of the blade receiver and one or more surfaces of the cutting blade.

20. The method of claim 16, further comprising coupling the drive belt to the pulley to provide driving power to one or more wheels.

21. A lawn mower comprising:
  a mower deck supported by a plurality of ground engaging wheels, the mower deck defining a cutting chamber;
  a prime mover coupled to a first side of the mower deck, the prime mover having a crankshaft extending through the mower deck and terminating at a first end within the cutting chamber; and
  a blade/belt driver assembly operable for interconnecting a cutting blade and a drive belt to the crankshaft, the blade/belt driver assembly comprising:
    a tube having a first bore defined by a first diameter, the first bore spanning between a first longitudinal end and a second longitudinal end of the tube;
    a pulley welded to the tube such that at least a portion of the pulley abuts the first longitudinal end of the tube, the pulley having a second bore defined by a second diameter, wherein the second diameter is less than the first diameter, and wherein the first bore and the second bore are operable to receive the first end of the crankshaft; and
    a blade receiver welded to the tube such that the blade receiver abuts the second longitudinal end of the tube, the blade receiver having a third bore defined by a third diameter.

22. The lawn mower of claim 21, wherein the third bore has a centerline which is substantially coaxial with a centerline of the second bore.

23. The lawn mower of claim 21, wherein the pulley comprises two portions fixed to one another.

24. The lawn mower of claim 21, wherein the blade/belt driver assembly is locatable relative to the crankshaft substantially by the second bore.

25. A blade/belt driver assembly operable for interconnecting a cutting blade and a drive belt to a lawn mower engine crankshaft, the blade/belt driver assembly comprising:
   a tube having a first bore defined by a first diameter, the first bore spanning between a first longitudinal end and a second longitudinal end of the tube;
   a pulley welded to the tube such that at least a portion of the pulley abuts the first longitudinal end of the tube, the pulley having a second bore defined by a second diameter, wherein the second diameter is less than the first diameter and further wherein the first bore and the second bore are operable to slide over a first end of the crankshaft; and
   a blade receiver welded to the tube such that the blade receiver abuts the second longitudinal end of the tube, the blade receiver having a third bore defined by a third diameter, the third bore having a centerline which is substantially coaxial with a centerline of the second bore.

26. The blade/belt driver assembly of claim 25, wherein the third diameter is less than both the first diameter and the second diameter.

27. The blade/belt driver assembly of claim 25, wherein the blade/belt driver assembly is securable to the crankshaft such that substantially no rotational movement of the blade/belt driver assembly relative to the crankshaft occurs.

28. The blade/belt driver assembly of claim 25, wherein the tube comprises a key along a portion of the first bore, the key operable to be received by a keyway in the crankshaft.

29. The blade/belt driver assembly of claim 28, wherein the key comprises a half-sheared portion of the tube.

30. The blade/belt driver assembly of claim 25, wherein the tube comprises drawn-over-mandrel (DOM) tubing.

31. A blade coupler assembly operable to interconnect a cutting blade and a drive belt to an engine crankshaft of a self-propelled lawn mower, the blade coupler assembly comprising:
   a blade/belt driver assembly comprising:
      a tube having a first bore defined by a first diameter, the first bore spanning between a first longitudinal end and a second longitudinal end of the tube;
      a pulley fixed to the tube such that at least a portion of the pulley abuts the first longitudinal end of the tube, the pulley having a second bore defined by a second diameter, wherein the second diameter is less than the first diameter and further wherein the first bore and the second bore are operable to slide over a first end of the engine crankshaft; and
      a blade receiver fixed to the tube such that the blade receiver abuts the second longitudinal end of the tube, the blade receiver having a third bore defined by a third diameter, wherein a portion of the blade receiver is operable to abut a first side of the cutting blade; and
   a fastener operable to secure the cutting blade and the blade/belt driver assembly to the first end of the engine crankshaft.

32. The blade coupler assembly of claim 31, further comprising a blade retainer operable to abut a second side of the cutting blade and retain the cutting blade in against the blade receiver.

33. The blade coupler assembly of claim 31, wherein the blade receiver comprises one or more nonplanar surfaces.

34. The blade coupler assembly of claim 33, further comprising a spacer operable to locate the cutting blade at a predetermined distance from the first end of the engine crankshaft.

35. The blade coupler assembly of claim 34, wherein the spacer has a profile operable to substantially coincide with the one or more nonplanar surfaces.

* * * * *

UNITED STATES PATENT AND TRADEMARK OFFICE
CERTIFICATE OF CORRECTION

PATENT NO. : 6,688,095 B2
DATED : February 10, 2004
INVENTOR(S) : Wadzinski

It is certified that error appears in the above-identified patent and that said Letters Patent is hereby corrected as shown below:

Column 1,
Line 33, please delete "modem" and insert -- modern --;

Column 2,
Lines 52 and 53, please delete "pulley welded to the such tube" and insert -- pulley welded to the tube --;

Column 4,
Line 14, please delete "attaches, in one" and insert -- attaches. In one --.

Signed and Sealed this

Seventh Day of September, 2004

JON W. DUDAS
*Director of the United States Patent and Trademark Office*